United States Patent
Kim

(10) Patent No.: US 8,336,295 B2
(45) Date of Patent: Dec. 25, 2012

(54) APPARATUS FOR REDUCING NITROGEN OXIDE IN EXHAUST PIPE

(75) Inventor: Chang Dae Kim, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 589 days.

(21) Appl. No.: 12/333,688

(22) Filed: Dec. 12, 2008

(65) Prior Publication Data

US 2009/0151334 A1  Jun. 18, 2009

(30) Foreign Application Priority Data

Dec. 14, 2007 (KR) .......... 10-2007-0131561

(51) Int. Cl.
  *F01N 3/00* (2006.01)
(52) U.S. Cl. ........................... 60/286; 60/295
(58) Field of Classification Search .......... 60/286, 60/295
  See application file for complete search history.

(56) References Cited

U.S. PATENT DOCUMENTS

| 6,996,975 | B2 * | 2/2006 | Radhamohan et al. | 60/286 |
|---|---|---|---|---|
| 7,448,206 | B2 * | 11/2008 | Meingast et al. | 60/286 |
| 7,765,800 | B2 * | 8/2010 | Tsumagari et al. | 60/301 |
| 7,814,745 | B2 * | 10/2010 | Levin et al. | 60/286 |
| 2004/0159096 | A1 * | 8/2004 | Yasui et al. | 60/286 |
| 2007/0000240 | A1 * | 1/2007 | Hirata et al. | 60/286 |
| 2007/0243115 | A1 * | 10/2007 | Tsumagari et al. | 422/168 |
| 2007/0245723 | A1 * | 10/2007 | Kamoshita et al. | 60/299 |
| 2008/0066454 | A1 * | 3/2008 | Viola | 60/286 |
| 2008/0223019 | A1 * | 9/2008 | Gonze et al. | 60/286 |
| 2008/0302088 | A1 * | 12/2008 | Koehler et al. | 60/286 |
| 2010/0101215 | A1 * | 4/2010 | Wu et al. | 60/286 |

FOREIGN PATENT DOCUMENTS

| EP | 1481719 A2 | 12/2004 |
|---|---|---|
| EP | 1715153 A1 * | 10/2006 |
| JP | 2006-9608 A | 1/2006 |

* cited by examiner

*Primary Examiner* — Thomas Denion
*Assistant Examiner* — Matthew T Largi
(74) *Attorney, Agent, or Firm* — Morgan, Lewis & Bockius LLP

(57) ABSTRACT

An apparatus for reducing nitrogen oxide in an exhaust pipe, may include a nitrogen oxide sensor that is mounted in the exhaust pipe and that measures amount of the nitrogen oxide in exhaust gas, a nozzle that is disposed on the exhaust pipe to be spaced apart from the nitrogen oxide sensor to a downstream side of the nitrogen oxide sensor by a first predetermined length and that injects urea corresponding to the amount of the nitrogen oxide, a mixer that mixes the urea with the exhaust gas and that is disposed at a downstream side of the nozzle on the exhaust pipe to be spaced apart by a second predetermined length from the nozzle, and a de-nitrification catalyst reaction device that is disposed at a downstream side of the mixer on the exhaust pipe, purifies the nitrogen oxide, and includes an inlet portion having a predetermined length.

5 Claims, 2 Drawing Sheets

APPARATUS FOR REDUCING NITROGEN OXIDE IN EXHAUST PIPE

CROSS-REFERENCE TO RELATED APPLICATION

The present application claims priority to Korean Patent Application Number 10-2007-0131561 filed Dec. 14, 2007, the entire contents of which Application is incorporated herein for all purposes by this reference.

BACKGROUND OF THE INVENTION

1. Field of the Invention

The present invention relates to an apparatus for reducing nitrogen oxide of exhaust gas, and more particularly to an apparatus for reducing nitrogen oxide for mixing urea with the nitrogen oxide so that the purification rate of the nitrogen oxide in the exhaust gas can be improved.

2. Description of Related Art

Generally, exhaust gas that is exhausted through the exhaust manifold of an engine is induced to pass through a catalytic converter that is mounted in the middle of an exhaust pipe to be purified, and the noise thereof is reduced while passing through a muffler and the exhaust gas is discharged to the outside through a tail pipe. The catalytic converter is a type of soot filtering device or diesel particulate filter (DPF) to process the pollution materials that are included in the exhaust gas. And, a catalyst support is formed inside the catalyst converter to filter the particulate materials that are included in the exhaust gas and to purify the exhaust gas that is exhausted from the engine through a chemical reaction.

One of the catalysts that are applied to the catalyst converter that functions as above is a selective catalyst reduction apparatus (SCR). Reducing agents such as carbon monoxide, total hydrocarbon (THC), and so on react well with nitrogen oxide rather than oxygen in the selective catalyst reduction apparatus (SCR), so it is called a selective catalyst reduction apparatus (SCR). Among the selective catalyst reducing apparatuses, the ammonia-SCR uses ammonia as a reducing agent to purify the nitrogen oxide, has good selectiveness to the NO, and has a merit in which it reacts well with the NO in the presence of oxygen.

The urea-SCR that is applied in a vehicle like the ammonia-SCR also selectively eliminates nitrogen oxide. The urea-SCR injects an aqueous solution of the urea at an upstream side of the catalyst and uses ammonia that is transformed from the injected urea to selectively reduce the nitrogen oxide, so it is called a urea-SCR.

In the urea-SCR, when the injection amount of the urea is increased, the purification rate of the nitrogen oxide can be increased. However, when the urea is injected more than normal, remaining urea that does not react with the nitrogen oxide is transformed to ammonia. Accordingly, it is very important to optimize the injection amount of the urea and to simultaneously improve the purification rate of the nitrogen oxide in the urea-SCR.

The injected urea is to be uniformly mixed with the exhaust gas so as to enhance the purification rate of the nitrogen oxide, and the length of the exhaust apparatus needs to be lengthened so as to improve the mixing rate of the urea and the exhaust gas. However, the exhaust apparatus of the vehicle is set at a predetermined length, so the urea and the exhaust gas cannot be uniformly mixed to flow into the urea-SCR such that the purification efficiency of the nitrogen oxide is reduced. Also, the ammonia that remains by not reacting with the nitrogen oxide is discharged to the outside and causes an offensive order from the exhaust gas.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for reducing nitrogen oxide in an exhaust pipe having advantages of improving the mixing rate of urea and exhaust gas in an exhaust apparatus having a set length such that the purification efficiency of the nitrogen oxide in the exhaust gas can be enhanced.

In an aspect of the present invention, an apparatus for reducing nitrogen oxide in an exhaust pipe, may include a nitrogen oxide sensor that is mounted in the exhaust pipe and that measures amount of the nitrogen oxide in exhaust gas, a nozzle that is disposed on the exhaust pipe to be spaced apart from the nitrogen oxide sensor to a downstream side of the nitrogen oxide sensor by a first predetermined length and that injects urea corresponding to the amount of the nitrogen oxide, a mixer that mixes the urea with the exhaust gas and that is disposed at a downstream side of the nozzle on the exhaust pipe to be spaced apart by a second predetermined length from the nozzle, and a de-nitrification catalyst reaction device that is disposed at a downstream side of the mixer on the exhaust pipe, purifies the nitrogen oxide, and includes an inlet portion having a predetermined length.

The exhaust pipe, the mixer, the inlet portion of the de-nitrification catalyst reaction device, and the de-nitrification catalyst reaction device may be disposed coaxially each other.

A portion of the exhaust pipe disposed between the nitrogen oxide sensor and the mixer may have a uniform diameter.

The apparatus for reducing nitrogen oxide may further include a stabilizing portion disposed between the mixer and the inlet portion of the de-nitrification catalyst reaction device, wherein the stabilizing portion have a third predetermined length.

The third predetermined length may range from approximately 1 to approximately 2 times longer than diameter of the exhaust pipe.

Diameter of the stabilizing portion may be substantially the same as that of the exhaust pipe.

The stabilizing portion may be disposed coaxial with the exhaust pipe.

The stabilizing portion may have a dual pipe structure.

The first and second predetermined lengths respectively may range from approximately 1 to approximately 2 times longer than diameter of the exhaust pipe.

The first predetermined length may range from approximately 1.5 to approximately 2 times longer than the diameter of the exhaust pipe.

The second predetermined length may range from approximately 1 to approximately 2 times longer than the diameter of the exhaust pipe.

An injection angle of the nozzle ma range from approximately 15 to approximately 45 degrees with respect to longitudinal axis of the exhaust pipe, wherein the injection angle of the nozzle is oriented toward the mixer.

The predetermined length of the inlet portion of the de-nitrification catalyst reaction device may range from approximately 0.7 to approximately 2 times longer than diameter of the de-nitrification catalyst reaction.

The inlet portion may be shaped of a truncated cone.

The inlet portion may be shaped of a streamlined truncated cone.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
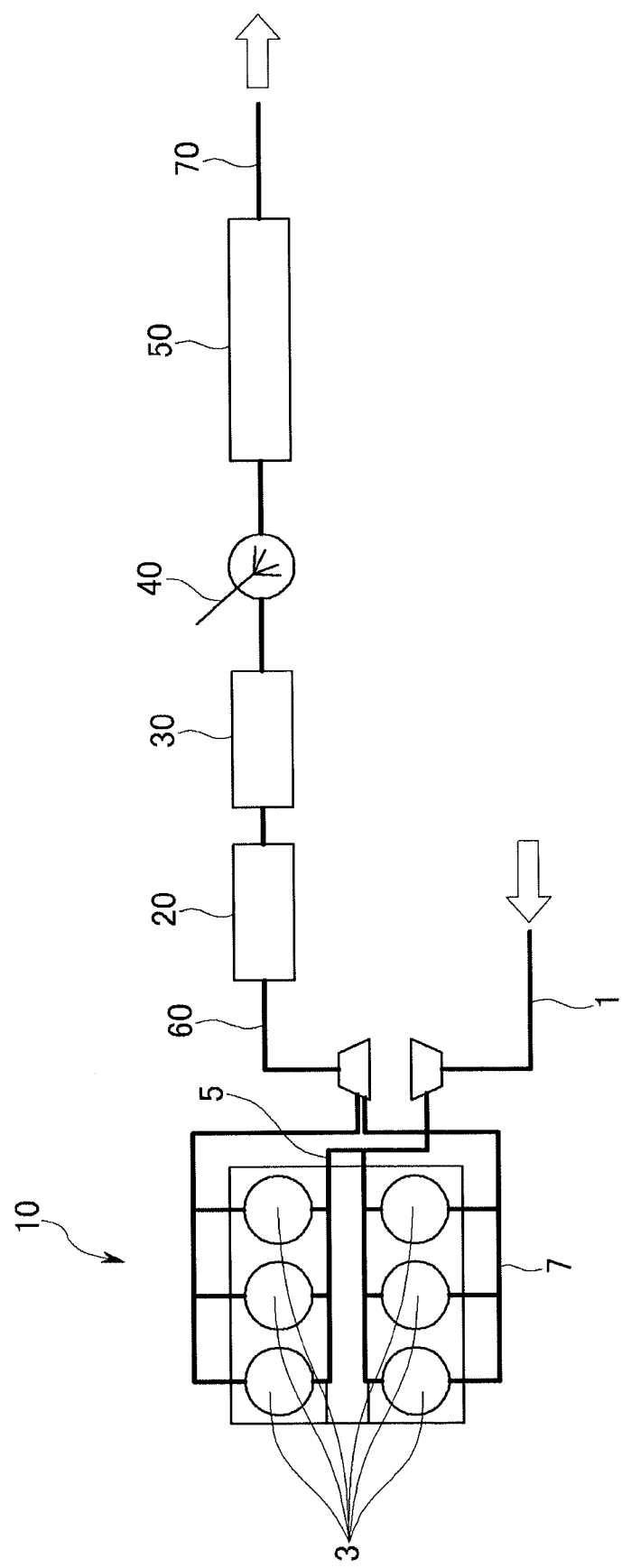
FIG. 1 is a schematic diagram showing an exhaust device in which a device for reducing nitrogen oxide in exhaust gas is applied according to an exemplary embodiment of the present invention.

FIG. 1 is a schematic diagram showing an exhaust device in which a device for reducing nitrogen oxide in exhaust gas is applied according to various embodiments of the present invention.

As shown in FIG. 1, the exhaust gas of an engine 10 flows in an exhaust pipe 60, in which a plurality of harmful ingredients are eliminated, and is exhausted to the outside through a tail pipe 70.

The engine 10 includes a plurality of cylinder 3 to combust a mixture gas. Each cylinder is connected to an intake manifold 5 to receive the mixture gas, and the intake manifold 5 is connected to an intake pipe 1 to receive outside air.

Also, the cylinder 3 is connected to an exhaust manifold 7, and the exhaust gas that is generated in a combustion process is collected in the exhaust manifold 7. The exhaust manifold 7 is connected to the exhaust pipe 60.

A diesel oxidation catalyst apparatus 20, a soot reduction device 30, a nozzle 40, and a de-nitrification catalyst reaction device 50 are mounted on the exhaust pipe 60 so as to purify harmful ingredients that are included in the exhaust gas.

The diesel oxidation catalyst apparatus 20 transforms the nitrogen oxide that is included in the exhaust gas to nitrogen dioxide so that the de-nitrification catalyst reaction device 50 can use the nitrogen dioxide.

The soot reduction device 30 filters particulate materials that are contained in the exhaust gas and burns them.

The nozzle 40 injects urea into the exhaust gas and the injected urea is transformed to NH3 to be used in the de-nitrification catalyst reaction device 50.

The de-nitrification catalyst reaction device 50 uses the NH3 that is generated from the injected urea to transform the nitrogen oxide to nitrogen gas.

The diesel oxidation catalyst apparatus 20, the soot reduction device 30, the nozzle 40, and the de-nitrification catalyst reaction device 50 are known to a person of ordinary skill in the art, so a detailed description thereof will be omitted.

Figure 2:
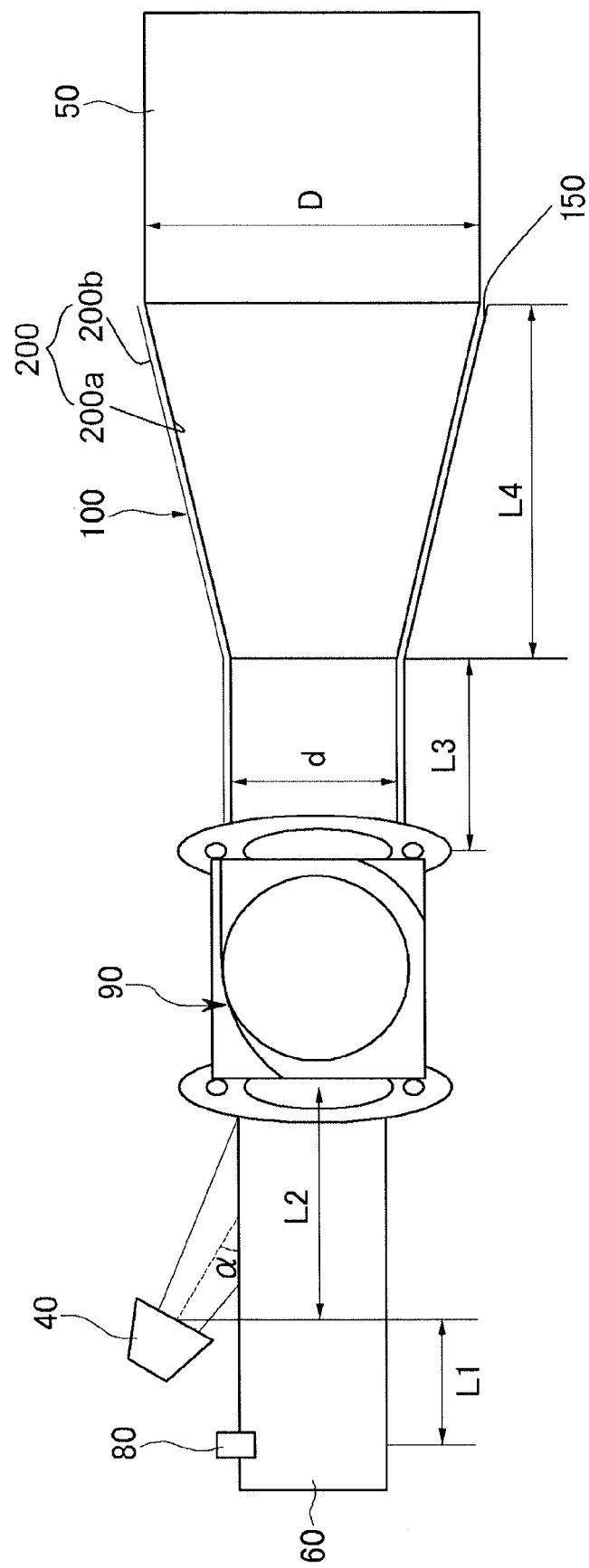
FIG. 2 is a schematic diagram of a device for reducing nitrogen oxide in exhaust gas according to an exemplary embodiment of the present invention.

FIG. 2 is a schematic diagram of a device for reducing nitrogen oxide in exhaust gas according to various embodiments of the present invention.

As shown in FIG. 2, the nitrogen oxide reduction device in the exhaust pipe includes a nitrogen oxide sensor 80, the nozzle 40, a mixer 90, and the de-nitrification catalyst reaction device 50 according to various embodiments of the present invention.

The nitrogen oxide sensor 80 measures the nitrogen oxide amount that is contained in the exhaust gas and controls the urea amount that is injected through the nozzle 40 based on the measured nitrogen oxide amount.

The nozzle 40 is disposed in the rear of the nitrogen oxide sensor 80 on the exhaust pipe 60, is spaced apart from the nitrogen oxide sensor 60 by a first predetermined length L1, and injects the urea in the exhaust gas. The first predetermined distance L1 is set to inject an accurate amount of urea corresponding to the nitrogen oxide that is measured by the nitrogen oxide sensor 60 considering the diameter of the exhaust pipe 60 and the speed of the exhaust gas. It is desirable that the first predetermined distance L1 ranges from one to two times longer than the diameter d of the exhaust pipe 60.

Also, it is desirable that the injection angle ($\alpha$) of the nozzle 40 ranges from 15 to 45 degrees so that the urea that is injected through the nozzle 40 can be uniformly mixed with the exhaust gas.

The mixer 90 is disposed at the rear of the nozzle 40 on the exhaust pipe 60 to be spaced apart from the nozzle 40 by a second predetermined distance L2 and to mix the injected urea with the exhaust gas. The second predetermined distance L2 is set to uniformly mix the injected urea with the exhaust gas considering the diameter of the exhaust pipe 60 and the speed of the exhaust gas. It is desirable that the second predetermined distance L2 ranges from one to two times longer than the diameter d of the exhaust pipe 60.

The de-nitrification catalyst reaction device 50 is disposed in the rear of the mixer 90 on the exhaust pipe 60 and includes an inlet portion 100 of a truncated cone shape. The de-nitrification catalyst reaction device 50 uses the NH3 that is generated from the urea to transform the nitrogen dioxide in the exhaust gas to the nitrogen gas.

The inlet portion 100 is disposed to be spaced apart from the mixer 90 by a third predetermined distance L3. The third predetermined distance L3 is set to stabilize the mixed flow of the exhaust gas and the urea, and it is desirable that the third predetermined distance L3 ranges from one to two times the diameter d of the exhaust pipe 60. Also, the inlet portion 100 has a truncated cone shape such that the diameter thereof is longer in a length direction. Accordingly, the length L4 of the inlet portion 100 ranges from 0.7 to two times the diameter D of the de-nitrification catalyst reaction device 50 considering the flow speed of the exhaust gas.

Also, a wall wetting phenomenon can take place on the exhaust pipe 60 from the mixer 90 to the inlet portion 100 and the inlet portion 100 of the de-nitrification catalyst reaction device 50, so the exhaust pipe 60 from the mixer 90 to the inlet portion 100 and the inlet portion 100 of the de-nitrification catalyst reaction device 50 can have a dual pipe structure 200 having inner pipe 200a and outer pipe 200b, wherein first ends of the inner pipe 200a and outer pipe 200b in the inlet portion 100 open to form an opening 150 therebetween.

In various embodiments of the present invention, the inlet portion 100 may have streamlined truncated cone shape so that ebb or vortex that may occur therein can be removed.

Furthermore, the exhaust pipe, the mixer and the inlet portion of the de-nitrification catalyst reaction device may be disposed coaxially each other so that gas flow resistance can be reduced.

In various aspects of the present invention, the apparatus for reducing nitrogen oxide in an exhaust pipe can improve the mixing rate of urea and exhaust gas in an exhaust apparatus having a set length such that the purification efficiency of the nitrogen oxide in the exhaust gas can be enhanced.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing nitrogen oxide in an exhaust pipe, comprising:
   a nitrogen oxide sensor that is mounted in the exhaust pipe and that measures amount of the nitrogen oxide in exhaust gas;
   a nozzle that is disposed on the exhaust pipe to be spaced apart from the nitrogen oxide sensor to a downstream side of the nitrogen oxide sensor by a first predetermined length and that injects urea corresponding to the amount of the nitrogen oxide;
   a mixer that mixes the urea with the exhaust gas and that is disposed at a downstream side of the nozzle on the exhaust pipe to be spaced apart by a second predetermined length from the nozzle;
   a de-nitrification catalyst reaction device that is disposed at a downstream side of the mixer on the exhaust pipe, purifies the nitrogen oxide, and includes an inlet portion having a predetermined length; and
   a stabilizing portion disposed between the mixer and the inlet portion of the de-nitrification catalyst reaction device, wherein the stabilizing portion has a third predetermined length,
   wherein the third predetermined length ranges from approximately 1 to approximately 2 times longer than a diameter of the exhaust pipe;
   wherein the first and second predetermined lengths respectively range from approximately 1 to approximately 2 times longer than a diameter of the exhaust pipe;
   wherein the stabilizing portion has a dual pipe structure formed of an inner pipe enclosed by an outer pipe;
   wherein an injection angle of the nozzle ranges from approximately 15 to approximately 45 degrees with respect to a longitudinal axis of the exhaust pipe;
   wherein the predetermined length of the inlet portion of the de-nitrification catalyst reaction device ranges from approximately 0.7 to approximately 2 times longer than a diameter of the de-nitrification catalyst reaction device;
   wherein a portion of the exhaust pipe disposed between the nitrogen oxide sensor and the mixer has a uniform diameter;
   wherein a diameter of the stabilizing portion is the same as that of a diameter of the exhaust pipe;
   wherein the stabilizing portion is disposed coaxial with the exhaust pipe;
   wherein the first predetermined length ranges from approximately 1.5 to approximately 2 times longer than the diameter of the exhaust pipe;
   wherein the inlet portion of the de-nitrification catalyst reaction device has the dual pipe structure formed of the inner pipe enclosed by the outer pipe; and
   wherein first ends of the inner pipe and the outer pipe in the inlet portion of the de-nitrification catalyst reaction device open to form an opening therebetween.

2. The apparatus for reducing nitrogen oxide of claim 1, wherein the exhaust pipe, the mixer, the inlet portion of the de-nitrification catalyst reaction device, and the de-nitrification catalyst reaction device are disposed coaxially to each other.

3. The apparatus for reducing nitrogen oxide of claim 1, wherein the injection angle of the nozzle is oriented toward the mixer.

4. The apparatus for reducing nitrogen oxide of claim 1, wherein the inlet portion is shaped of a truncated cone.

5. A passenger vehicle comprising the apparatus for reducing nitrogen oxide of claim 1.

* * * * *